Figure 1:
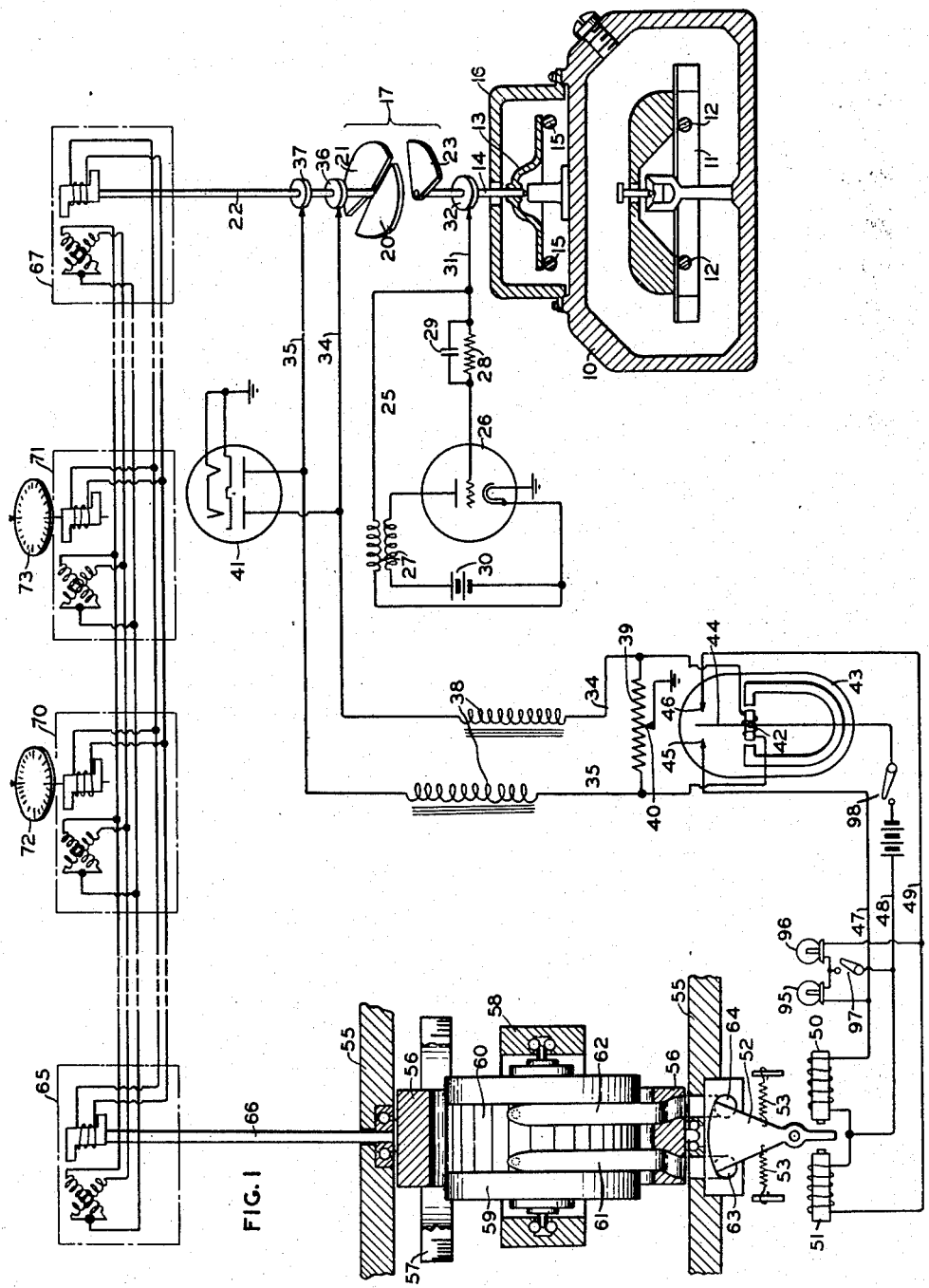

Jan. 21, 1947. L. F. CARTER 2,414,448
GYRO MAGNETIC COMPASS SYSTEM
Filed Nov. 6, 1941 2 Sheets-Sheet 1

INVENTOR
LESLIE F. CARTER
BY
Herbert H. Thompson
his ATTORNEY.

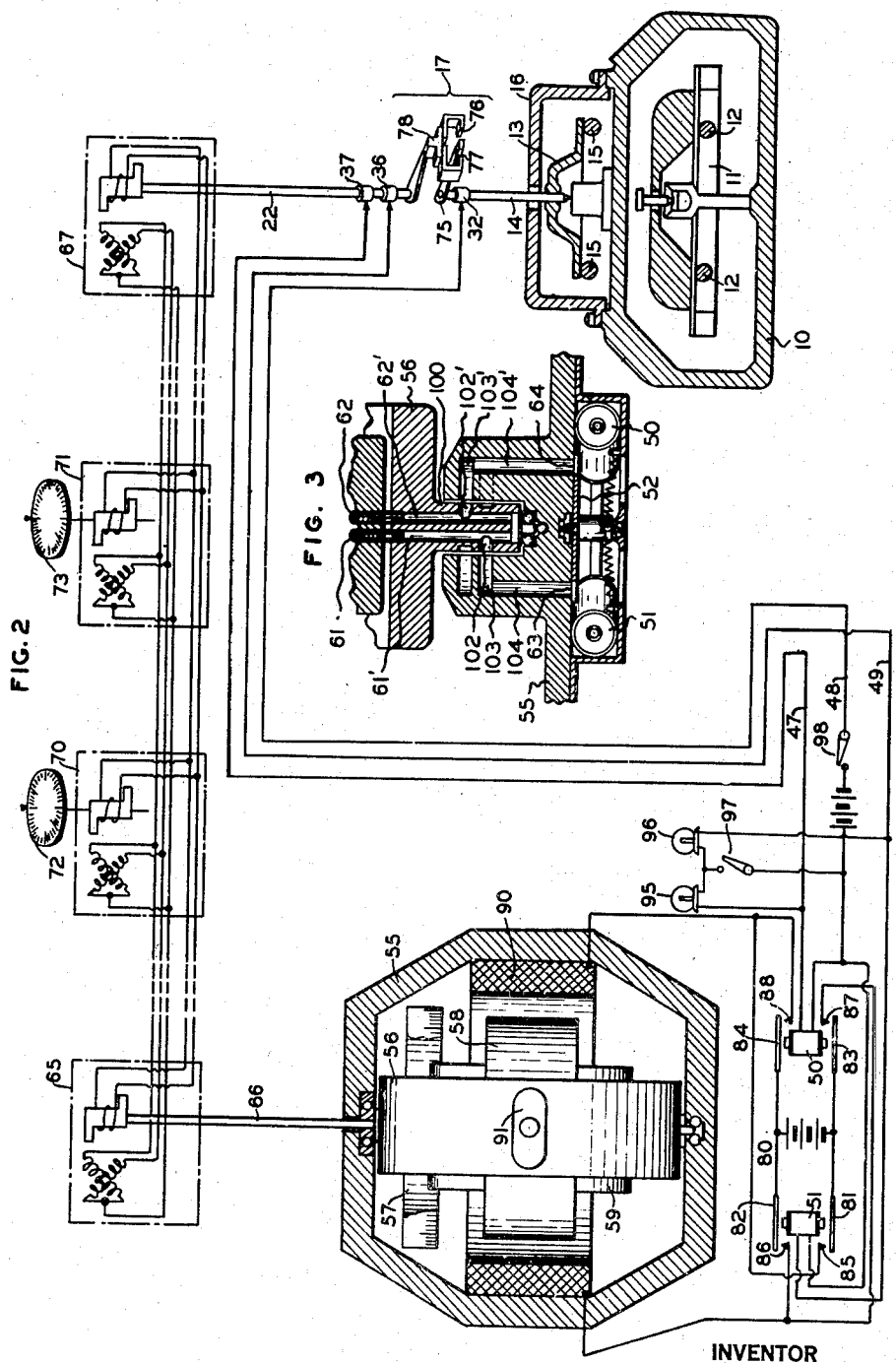

Patented Jan. 21, 1947

2,414,448

UNITED STATES PATENT OFFICE 2,414,448

GYRO MAGNETIC COMPASS SYSTEM

Leslie F. Carter, Leonia, N. J., assignor to Sperry Gyroscope Company, Inc., Brooklyn, N. Y., a corporation of New York Application November 6, 1941, Serial No. 418,031

6 Claims. (Cl. 33—222)

This invention relates to an improved gyromagnetic compass system wherein a directional gyro is made to integrate the undesirable movement of a conventional type magnetic compass card and thereby provide a non-oscillatory reference magnetic heading for the craft on which the system is employed.

The control exerted by the compass over the directional gyro of the system is obtained without the creation of disturbing torques, thus avoiding erroneous precessional movements thereof.

One of the features of the invention is to provide a compass controlling member and directional gyro controlled member system in which the transmitter of a transmitter-receiver repeating arrangement used as a part of the system is also available for use in operating a number of separate repeater compasses.

Another feature of the invention resides in the provision for controlling the transmitter of the repeating arrangement in the system from the gyro so that the separate position repeating receivers operated by the transmitter reflect the position of the stabilized or controlled member of the system.

A further feature of the invention consists in means situated at the compass instrument for obtaining a positional comparison of repeated indications from both the controlling and controlled members of the system which is effective to operate precession causing means to obtain a desired azimuth movement of the controlled gyro.

Another feature of the invention is contained in the specific provision of an impedance capacity bridge circuit by means of which the gyro precession causing means is directionally controlled.

Other features and structural details of the invention will be apparent from the following description, wherein Fig. 1 is a diagrammatic view of the preferred embodiment of the improved gyro-magnetic compass system, and Fig. 2 is a similar view illustrating a modification of the form of the invention shown in Fig. 1.

Fig. 3 shows the preferred actual construction of the lower bearing of the directional gyro portion of the gyro-magnetic compass, in vertical section.

The system illustrated in Fig. 1 includes a controlling member in the form of a compass instrument indicated generally at 10. In the illustrative form shown, the compass instrument consists of a pin point supported balanced frame 11 which has mounted thereon the spaced permanent magnets 12. The casing enclosure within which the frame 11 is contained is filled with a suitable fluid by means of which the movement of the position or direction seeking frame is damped. In accordance with conventional construction, a secondary or following compass may be employed, shown as enclosed in frame 13, fixed to rotatable shaft 14 the axis of which is vertically disposed, includes magnetic elements 15 thereon which are coupled magnetically with permanent magnets 12. The frame 13 is contained within a cover 16 which is mounted above the enclosure container for the damped sensitive compass element so that the shaft 14 and the pin point suspension of frame 11 are in alignment. Shaft 14 consequently seeks an angular position in correspondence with the position assumed by the frame 11 under influence of the magnets 12 or direction indicating sensitive part thereof.

The position comparing or signal generating means in this form of the invention is designated generally at 17, the same including a two part variable condenser arrangement, one part of which in the form of plate 23 is positioned from compass 12, by being secured to shaft 14 and consequently said part repeats the angular position of the compass magnets 12. The other part of the variable condenser constituting cooperating plates of the comparing means by which positional comparison between the controlling and controlled members is obtained is indicated at 20 and 21, the same being generally semicircular in shape and disposed with their substantially straight sides opposite one another. Plates 20 and 21 are mounted to rotate with shaft 22 which is situated in axial alignment with shaft 14 and is controlled as hereinafter described. The controlling member positioned plate is designated at 23, the same being sector-shape in form and suitably spaced in parallel relation from the plates 20 and 21 with which it cooperates. It will be understood that the plates of the two-part variable condenser arrangement are in positional agreement when equal areas of sector plate 23 are disposed opposite the respective separate plates 20 and 21. When this condition exists the improved gyro compass system is non-operative, the same otherwise being effective through means of gyro precession causing devices to restore the comparing means to agreement.

In the embodiment of the invention described, the capacity pick-off means for comparing the respective repeated positions of the controlling and controlled member of the system is included in a bridge circuit as hereinafter described. The variable condenser is energized by suitable means such as an oscillator circuit 25 including the usual triode tube 26, inductively coupled coils 27, grid leak resistor 28, by-pass condenser 29 and source 30 of plate voltage. Alternating current of a desired frequency, for example 200 kilocycles, is conducted to condenser plate 23 through lead 31 and slip ring 32 from the oscillator circuit 25.

Each of the rotatably mounted condenser plates 20 and 21 of the comparing means forms a part of a bridge circuit which includes leads 34 and 35 therefrom, respectively by way of slip rings 36 and 37, and choke coils 38 to the opposite terminals of a potentiometer 39 the adjustable element 40 of which is suitably grounded. In the instant case, a double diode tube 41 is utilized in the bridge circuit to obtain full wave rectification of the alternating current employed to energize the variable condenser of the system, the choke coils 38 also serving to remove any component of alternating current remaining in the circuit before it reaches the potentiometer 39. It may be noted that by positioning the filter network 38, 41 and the high frequency oscillator near the compass, the high frequency alternating current necessary for the operation of the condensers is confined to the vicinity of the compass. In other words, the transmission lines from the compass to the relay and gyro are direct current, so that no special precautions need be taken, to avoid prohibitive capacitative losses, except in the immediate vicinity of the compass.

The movable coil 42 of a galvanometer relay 43 is connected across the described bridge circuit and is thus controlled by the variable condenser arrangement thereof. Contact arm 44, which is adapted to swing between the spaced fixed contacts 45 and 46 in the galvanometer relay, is moved with coil 42 and the direction of its movement depends on the direction that the current takes in passing through the coil which is determined by the bridge circuit. Arm 44 controls a separately energized circuit formed by leads 47, 48, and 49, the circuit further including solenoids 50 and 51. When arm 44 engages either contact 45 or 46, this normally open circuit is closed so that either solenoid 50 or 51 is energized and an air controlling pivotally mounted sector plate 52 is moved as hereinafter described. The plate 52 is normally positioned in an ineffective condition by suitable centralizing means such as springs 53.

The conventional showing of the directional gyro instrument of the system in Fig. 1 includes a housing 55 in which the customary gimbal ring 56 is mounted to rotate about a normally vertical axis. An annular compass card 57 may be secured to the ring 56 so that an azimuth position directional indication can be obtained from the instrument when comparison of the card 57 is made with a suitable lubbers line situated on the housing 55. The normally horizontal or rotor bearing ring or frame is mounted in the usual manner on ring 56 and is herein designated at 58. The gyro rotor 59 is located on the said ring 58 in the customary manner and as shown includes buckets 60 on the peripheral surface thereof against which air is directed to spin the same. The pneumatically spun and precessed gyro of the general type shown is usually provided with a suitable air supplying means (not shown) in the form of a pressure or suction pump by which a pressure differential is maintained between the exterior atmospheric pressure and that maintained within the enclosing housing 55 of the instrument. In the instant case, the housing is preferably evacuated and air is drawn into the instrument through air directing nozzle elements 61 and 62 which are situated on opposite sides of the horizontal axis on which ring 58 is pivoted and are so placed that the jets therefrom impinge the buckets 60 and spin the gyro rotor 59. The nozzle pipes 61 and 62 are mounted on and extend through the vertical ring 56 and obtain air through the respective ports 63 and 64 situated in the housing 55. The normally central sector plate 52, heretofore described, is so positioned with respect to the ports 63 and 64 that equal amounts of air are drawn into the instrument for each of the nozzles 61 and 62 and consequently the torques about the horizontal axis of ring 58 are equal and opposite and are balanced. When disagreement or displacement from a position of agreement occurs in the comparing means at the compass instrument, the bridge circuit effects closure of the galvanometer relay arm 44 with either contact 45 or 46, the respective solenoid 50 or 51 is thereby energized and sector plate 52 is moved to assume a temporary position covering port 63 more than port 64 or vice versa. By this action, the air supply to one nozzle is throttled more than the other and the normal balance of forces about the horizontal axis of ring 58 is disturbed so that the vertical ring 56 of the gyro is caused to precess in azimuth in a direction that will restore positional agreement at the comparing means as hereinafter more particularly described.

As stated above, the showing in Fig. 1 of the gyro construction is largely diagrammatic and the preferred construction of the lower bearing is shown in Fig. 3, in which the parts are correspondingly numbered. It will be seen that in this construction the two nozzle pipes 61 and 62 are threaded in channels 61' and 62' extending through the vertical ring 56 and within the stem 100, extending downwardly therefrom and journaled in the interior of the casing 55. Channel 61', as shown, is connected with a lateral bore 102 lying opposite an annular channel 103 in housing 101, which in turn is connected with a vertical channel 104 therein, terminating in the port 63. Similarly, the bore 62' is connected with a lateral passage 102' in communication with an annular passage 103' in communication with the vertical passage 104', terminating in port 64. The ports are differentially controlled from a rotatably adjustable shutter 52 which differentially closes and opens the ports when displaced from its normal position by the excitation of one or the other of solenoids 50 or 51. Reference may be had to applicant's copending application, joint with Francis West, Jr., filed on even date herewith, Serial No. 418,032, (Patent No. 2,363,500, issued Nov. 28, 1944), for Gyro-magnetic compass system, for further details of this construction.

The improved system includes a means for repeating the azimuth position of the gyro at the comparing means which is in the form of the transmitter-receiver arrangement shown diagrammatically in Fig. 1. The position repeating electrical type of transmitter-receiver illustrated have interconnected pairs of coils positioned at 90° from one another for the stator parts. The rotors of the repeating means consist of parallel connected alternating current excited inductor members. The transmitter of the arrangement is indicated at 65, the rotor thereof being angularly positioned through means such as the vertical shaft driven by the vertical ring 56 of the gyro instrument in this instance. The receiver motor of the arrangement, designated at 67, positions the previously described shaft 22, the rotor element thereof being illustrated as forming a portion of the shaft so that condenser plates 20 and 21 which are mounted on the shaft assume an angular position corresponding to the angular position of the vertical ring 56 of the gyro. The comparing means consequently compares the angular repeated position of the gyro with the directional indication of the sensitive element of the compass, the comparison being made at the compass instrument. In the improved system, a single or number of separate position repeating receivers such as designated at 70 and 71 are adapted to be controlled from the transmitter of the transmitter-receiver repeating arrangement. The rotors of the individual repeating receivers 70 and 71 actuate suitable compass cards 72 and 73, respectively, which give a directional indication when compared to the usual lubbers lines associated therewith corresponding to the angular position of the compass controlled gyro instrument of the system.

Corresponding elements in the hereinbefore described system contained in the modification of the invention illustrated in Fig. 2 are designated by the same reference number. The change in the modified form of the invention over that previously described resides in the comparing means and the means controlled thereby for effecting precession in azimuth of the directional gyro. In Fig. 2, the comparing means 17 employed is a circuit closing device which includes compass instrument position repeating arm 75 mounted on shaft 14. The cooperating member of the circuit closing device for arm 75 is bifurcated in shape and provides oppositely disposed spaced contacts 76 and 77 between which arm 75 moves and with which it is adapted to close an energized electrical circuit of the character previously described when the parts come into actual contact. Contact providing bifurcated member 78 is mounted on shaft 22 and is consequently positioned in azimuth in correspondence with the rotor of the receiver 67 which repeats the position of the gyro's vertical ring 56 through the transmitter 65 of the hereinbefore-described transmitter-receiver arrangement. In this instance, the selectivity of the solenoid 50—51 control circuit, which is determined directly by the circuit closing device defining the comparing means 17, is employed to effect the operation of a normally open reversing switch indicated at 80. Switch 80 is a part of a separately energized circuit and includes movable pairs of arms 81—82 and 83—84 which respectively are adapted to engage fixed contact pieces 85—86 and 87—88. When solenoid 51 is energized arms 81 and 82 are closed with contacts 85—86 and similarly when solenoid 52 is energized arms 83—84 engage the associated contacts 87 and 88. By this means, the direction of movement of current through annular coil 90 is controlled so that the magnetic field set-up thereby is effective to cause precessional movement of the vertical ring 56 of the gyro in the desired azimuthal direction. In this electromagnetic precession gyro control, the coil 90 is mounted within the gyro housing 55 and surrounds the horizontal ring 58 thereof which includes on one or both of the trunnions, by which it is mounted on the vertical ring 56, a magnetic field producing element such as the permanent magnet 91 shown in Fig. 2. In this instance, magnet 91 is fixed to an extending portion of one of the horizontal trunnions of ring 58 in a position situated exteriorly of the vertical ring 56 and adjacent to the annular coil 90 with which it cooperates.

Furthermore in this connection, it is apparent that the reversing switch 80 and associated circuit in this modified form of the invention may readily be eliminated by providing a coil 90 having opposing windings which are separately energized from the selective comparing means controlled circuit by way of directly utilized leads 47, 48 and 49 in this event. The solenoids 51 and 52 in the circuit closing device controlled selective circuit of this further character would also be eliminated.

As included in both forms of the invention illustrated in the drawings, a group or pair of signal lights designated at 95 and 96 may be selectively illuminated by inclusion in parallel with the respective solenoids in the gyro precession circuit of the system, the lights serving to give a signal to the pilot of the craft on which the system is employed by giving a visual indication whether either solenoid is excited. Suitable switches may also be employed in this circuit, both for rendering the signal lights inoperative and for disabling the system when the same may be desirable. These switches are respectively indicated at 97 and 98. Such signal means, however, is not claimed herein, being reserved for the copending application of Caesar F. Fragola, Serial No. 612,189, for Gyro magnetic compass, filed August 23, 1945, assigned to a common assignee.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim as my invention:

1. A gyro-magnetic compass system having a spaced magnetic compass and directional gyro, a two-part condenser controller at the magnetic compass, one part of which is positioned by said magnetic compass, an electrical transmitter positioned by the directional gyroscope, a repeater motor at the magnetic compass controlled by said transmitter and positioning the second part of said condenser, and torque applying means for the gyro controlled by said condenser.

2. In a gyro-magnetic compass system, the combination of, a compass instrument having a direction indicating sensitive element, a two part capacity pick-off situated at the compass instrument, one part being controlled by and following the directional position of said element, a directional gyro remote from said compass, means controlled by said gyro and repeating the azimuth position of the gyro at the compass, said means also positioning the second part of said capacity pick-off for comparing the positions of the gyro and compass, a bridge circuit including said capacity pick-off rendered effective by disagreement in the positions of the gyro and compass, means controlled by said bridge circuit for effecting precession of the gyro in azimuth in a direction to restore the compared positions to agreement, and means for energizing said bridge circuit.

3. In a gyro-magnetic compass system, the combination of, a compass instrument having a direction indicating sensitive element, a directional gyro remote from said compass, an azimuth position transmitter controlled by the gyro, a receiver for said transmitter, means controlled by said receiver for repeating the azimuth position of the gyro at the compass instrument, two-part capacity pick-off means at the compass, means for altering the normal position of said two parts upon departure between the aligned position of said receiver and said compass, a bridge circuit including said capacity pick-off means rendered effective by relative movement from a predetermined relation of the parts of said pick-off, means controlled by said bridge circuit for effecting precession of the gyro in azimuth in a direction to restore said parts to said predetermined relation, and rectifying means for energizing said bridge circuit from the high frequency alternating current output of said capacity means.

4. In a gyro-magnetic compass system, the combination with a magnetic compass having a north-seeking sensitive element, a directional gyroscope remote from said compass, electrical repeater means actuated and controlled by said gyroscope for repeating the azimuth position of the gyroscope adjacent the compass, a two-part condenser adjacent the compass, one part being connected to rotate with said magnetic sensitive element and the other part being rotated by said electrical repeater means, means adjacent the compass for supplying high frequency alternating current to said condenser, the output of said condenser being responsive to positional disagreement between the two parts thereof, means also adjacent the compass for filtering and rectifying said output, and direct current means at the gyroscope for applying a torque thereto, said filtering and rectifying means being controlled by the rectified output of said condenser.

5. A gyro-magnetic compass system having a spaced magnetic compass and directional gyro, a two-part condenser controller at the magnetic compass, one part of which is positioned by said magnetic compass, an electrical transmitter positioned by the directional gyroscope, a plurality of repeater motors actuated from said transmitter, a repeater compass indicator connected to some of said repeater motors, another of said repeater motors being connected to the second part of said condenser for positioning the same, and reversible torque means for the gyroscope controlled by said condenser and adapted to apply a torque in either direction about the horizontal axis of the gyroscope for causing it to follow in azimuth said magnetic compass, whereby said repeater compasses also indicate the magnetic compass reading.

6. A gyro-magnetic compass system having a spaced magnetic compass and directional gyro, a slave magnet above the magnetic compass so that it follows the compass, a two-part condenser controller adjacent said magnet, one part of which is positioned by said slave magnet, an electrical transmitter positioned by the directional gyroscope, a repeater motor at the magnetic compass controlled by said transmitter and positioning the second part of said condenser, and means for applying a precessing torque to the gyro, said means being controlled by said condenser.

LESLIE F. CARTER.